(12) United States Patent
Ohkusa et al.

(10) Patent No.: US 9,193,112 B2
(45) Date of Patent: Nov. 24, 2015

(54) THREE-DIMENSIONAL PRINTING APPARATUS

(71) Applicant: Roland DG Corporation, Hamamatsu-shi, Shizuoka (JP)

(72) Inventors: Keigo Ohkusa, Hamamatsu (JP); Takayuki Sakurai, Hamamatsu (JP)

(73) Assignee: Roland DG Corporation, Shizuoka (JP)

( * ) Notice: Subject to any disclaimer, the term of this patent is extended or adjusted under 35 U.S.C. 154(b) by 43 days.

(21) Appl. No.: 14/454,787

(22) Filed: Aug. 8, 2014

(65) Prior Publication Data
US 2015/0044318 A1      Feb. 12, 2015

(30) Foreign Application Priority Data
Aug. 9, 2013   (JP) .................................. 2013-166840

(51) Int. Cl.
*B29C 67/00*   (2006.01)

(52) U.S. Cl.
CPC ......... *B29C 67/0085* (2013.01); *B29C 67/0066* (2013.01); *B29C 67/0092* (2013.01)

(58) Field of Classification Search
CPC .................. B29C 67/0085; B29C 67/0092
USPC ........................................................ 425/174.4
See application file for complete search history.

(56) References Cited

U.S. PATENT DOCUMENTS

| 5,089,184 A | 2/1992 | Hirano et al. |
| 2002/0155189 A1 | 10/2002 | John |
| 2012/0195994 A1* | 8/2012 | El-Siblani et al. ......... 425/174.4 |
| 2013/0052292 A1 | 2/2013 | Busato |

FOREIGN PATENT DOCUMENTS

| EP | 2 454 080 | 5/2012 |
| JP | 2003-039564 A | 2/2003 |

OTHER PUBLICATIONS

Official Communication issued in corresponding European Patent Application No. 14180372.6, mailed on Jan. 7, 2015.

* cited by examiner

*Primary Examiner* — Alison Hindenlang
*Assistant Examiner* — Robert J Grun
(74) *Attorney, Agent, or Firm* — Keating & Bennett, LLP

(57) ABSTRACT

A three-dimensional printing apparatus includes a tank that stores a liquid photo-curable resin; a base on which the tank is placed and which includes a light passage portion through which light passes; an optical device that is disposed below the base, includes a light source, and irradiates the resin with light emitted from the light source through the light passage portion; and a holder provided above the tank so that when lowered, the holder is immersed in the resin, and when raised, the holder lifts the cured resin. A front-rear length of the tank is longer than a front-rear length of the holder. A front-rear center of the holder is located rearward relative to a front-rear center of the tank, and a front-rear length between a front end of the tank and a front end of the holder is equal to or longer than the front-rear length of the holder.

8 Claims, 4 Drawing Sheets

_US 9,193,112 B2_

THREE-DIMENSIONAL PRINTING APPARATUS

This application claims priority to Patent Application No. 2013-166840 filed in Japan on Aug. 9, 2013, the entire contents of which are hereby incorporated by reference.

BACKGROUND OF THE INVENTION

1. Field of the Invention

The present invention relates to three-dimensional printing apparatuses.

2. Description of the Related Art

A three-dimensional printing apparatus is conventionally known in which a liquid photo-curable resin stored inside a tank is irradiated with light so as to cure the photo-curable resin, thus forming a three-dimensional object (see, for example, JP 2003-39564 A).

A three-dimensional printing apparatus of this type includes a base provided with an opening, a tank placed on the base, and a raisable and lowerable holder disposed above the tank. An optical system is disposed below the tank. For example, the optical system includes a light source that emits light and a mirror. The light emitted from the light source is reflected by the mirror. The photo-curable resin inside the tank is irradiated with the reflected light through the opening of the base. A portion of the photo-curable resin inside the tank which has been irradiated with the light is cured. By controlling a light irradiation position, a position at which the resin is to be cured is appropriately changed. Hence, the cured resin can form a desired cross-sectional shape. A desired cross-sectional shape is continuously formed downward by sequentially raising the holder. As a result, a desired three-dimensional object is formed by the cured photo-curable resin.

In performing printing of a three-dimensional object (hereinafter simply referred to as "three-dimensional printing"), a cover that covers the tank and the holder is disposed above the base so as to prevent leakage of light to outside. In the three-dimensional printing apparatus disclosed in JP 2003-39564, the tank (which is referred to as a "trough" in JP 2003-39564) is reduced in area in a plan view, and therefore, the cover is reduced in size. As a result, the apparatus is reduced in size.

In the above-described three-dimensional printing apparatus, an object is formed layer by layer by sequentially raising the holder. When the holder is raised, it is important to rapidly and stably supply a liquid photo-curable resin, which is to form a next layer, to a region under a cured photo-curable resin lifted by the holder. In the three-dimensional printing apparatus disclosed in JP 2003-39564, the tank is only slightly larger than the holder (which is referred to as a "carrier platform" in JP 2003-39564) in the plan view. Hence, the area of the tank in the plan view is small. Thus, in this case, it is more difficult for a liquid photo-curable resin to flow inside the tank than when the area of the tank in the plan view is large. Therefore, when the holder is raised, a liquid photo-curable resin that has already slightly been irradiated with light and has thus been somewhat degraded is likely to remain in a region under a cured photo-curable resin. Thus, it is difficult to supply a fresh photo-curable resin that is not yet irradiated with light. Consequently, a resulting three-dimensional object might be degraded in quality, thus making it difficult to form the three-dimensional object as desired.

SUMMARY OF THE INVENTION

Accordingly, preferred embodiments of the present invention provide a three-dimensional printing apparatus that forms a high quality three-dimensional object.

A three-dimensional printing apparatus according to a preferred embodiment of the present invention includes a tank, abase, an optical device, and a holder. The tank stores a photo-curable resin in liquid form. The tank is placed on the base. The base includes a light passage portion through which light to be applied to the photo-curable resin passes. The optical device is disposed below the base, and includes at least a light source that emits light. The optical device irradiates the photo-curable resin inside the tank with the light emitted from the light source through the light passage portion. The holder is provided above the tank so as to be raisable and lowerable. The holder is arranged so that when lowered, the holder is immersed in the photo-curable resin inside the tank, and when raised, the holder lifts the photo-curable resin that has been cured with irradiation of the light. A length of the tank in a given direction is longer than a length of the holder in the given direction. When the given direction is defined as a front-rear direction, a center of the holder in the front-rear direction is located rearward relative to a center of the tank in the front-rear direction, and a length between a front end of the tank and a front end of the holder in the front-rear direction preferably is equal to or longer than the length of the holder in the front-rear direction.

In the above-described three-dimensional printing apparatus, the length between the front end of the tank and the front end of the holder in the front-rear direction preferably is equal to or longer than the length of the holder in the front-rear direction. The tank extends to a great extent forward relative to the holder. Thus, an area of the tank in a plan view is large. Hence, the photo-curable resin in liquid form is likely to flow inside the tank. Upon raising of the holder, a fresh photo-curable resin that is not yet irradiated with light is likely to be supplied to a region under the cured photo-curable resin. Consequently, a resulting three-dimensional object is improved in quality.

According to one preferred embodiment of the present invention, the three-dimensional printing apparatus preferably further includes a support column placed on the base. The support column preferably supports the holder so that the holder is raisable and lowerable. The holder is preferably disposed in front of the support column.

According to the above-described preferred embodiment, the support column is preferably disposed behind the holder, thus preventing interference between the support column and the tank that extends forward relative to the holder.

According another preferred embodiment of the present invention, the three-dimensional printing apparatus preferably further includes a cover that covers the tank, the holder, and the support column. The cover preferably includes an upper wall inclined so that its front portion is located downward.

When the tank extends forward, the cover that covers components such as the tank tends to increase in size. However, according to the above-described preferred embodiment, the upper wall of the cover is inclined so that its front portion is located downward. Therefore, an increase in size of the cover is prevented more effectively than when the upper wall of the cover extends horizontally.

According to still another preferred embodiment of the present invention, the light source of the optical device is preferably disposed forward relative to the holder. A rear end portion of the light source is preferably disposed below the tank.

When the tank extends forward, extra space is provided below the tank (in particular, below a front portion of the tank). According to the above-described preferred embodiment, the extra space is effectively utilized as an installation space for the light source. Consequently, an increase in size of the three-dimensional printing apparatus is prevented.

According to yet another preferred embodiment of the present invention, the light passage portion is preferably an opening provided in the base. The opening is preferably larger than the holder in the front-rear direction and a right-left direction in a plan view. The holder is preferably disposed inward relative to a peripheral edge of the opening in the plan view.

According to the above-described preferred embodiment, the light emitted from the light source passes through the opening, so that a portion of the photo-curable resin which is close to the holder is easily irradiated with the light. Hence, a desired three-dimensional object is easily formed. When the opening is large, there is a high possibility that a portion of the photo-curable resin which is not close to the holder will also be irradiated with the light, which might make it difficult to supply the fresh photo-curable resin to a region close to the holder. However, flowability of the photo-curable resin inside the tank is favorably high, and thus the fresh photo-curable resin that is not yet irradiated with the light is likely to be supplied to the region close to the holder. Consequently, even when the opening is large, a high quality three-dimensional object is formed.

According to still yet another preferred embodiment of the present invention, the three-dimensional printing apparatus preferably further includes a tilting device that tilts the tank so that a front portion of a bottom surface of the tank is disposed higher than a rear portion of the bottom surface of the tank.

When the tank extends forward, it is undesirably difficult to supply the photo-curable resin in liquid form to the region under the cured photo-curable resin upon a decrease in the amount of the photo-curable resin inside the tank. However, according to the above-described preferred embodiment, the tank is tilted rearward by the tilting device. Thus, when the amount of the photo-curable resin inside the tank is small, the photo-curable resin inside the tank is gathered in a rear portion of the tank. Hence, even when the amount of the photo-curable resin inside the tank is small, the photo-curable resin in liquid form is successfully supplied to the region under the cured photo-curable resin.

According to another preferred embodiment of the present invention, the three-dimensional printing apparatus preferably further includes a case that supports the base, the optical device, and the holder. The tilting device is preferably arranged to tilt the case.

The tank is placed on the base. Hence, the tank is tilted by tilting the base. According to the above-described preferred embodiment, the tank is tilted simply by tilting the case. The tilting device has a simple structure. Note that as the tank is tilted, not only the holder but also the optical device is tilted. Consequently, a resulting three-dimensional object does not degrade in quality.

According to still another preferred embodiment of the present invention, the light source preferably is a projector that includes a lens and emits light rearward. The optical device preferably further includes a mirror disposed behind the projector. The mirror preferably reflects the light, emitted from the projector, toward the light passage portion of the base. An optical axis of the lens is preferably located lower than a center of the mirror in a side view.

The light emitted from the projector is likely to be emitted slightly upward relative to the optical axis of the lens. According to the above-described preferred embodiment, the optical axis of the lens is located lower than the center of the mirror. Hence, the light is easily emitted from the projector toward the mirror. Thus, the light reflected by the mirror is likely to be guided toward the light passage portion of the base. Therefore, the photo-curable resin inside the tank is likely to be irradiated with the light successfully. Consequently, a resulting three-dimensional object is improved in quality.

According to yet another preferred embodiment of the present invention, a lower end of the lens and a lower end of the mirror are preferably located at the same or substantially the same height.

According to the above-described embodiment, the light is easily emitted from the projector toward the mirror. Hence, the light reflected by the mirror is likely to be guided toward the light passage portion of the base. Consequently, a resulting three-dimensional object is improved in quality.

According to still yet another preferred embodiment of the present invention, the tank preferably includes a bottom plate, a portion of which is located over the light passage portion when the tank is placed on the base. A state in which the tank is placed on the base so that a rear portion of the bottom plate covers the light passage portion is defined as a first state. A state in which the tank is placed on the base so that positions of front and rear of the tank are interchanged from the positions thereof in the first state and a front portion of the bottom plate covers the light passage portion is defined as a second state. A portion of the bottom plate which is located over the light passage portion in the first state is preferably located outside of a region over the light passage portion in the second state.

When the same spot of the tank is irradiated with the light from the light source for a long period of time with the tank placed on the base in the first state, a portion of the tank might partially deteriorate with time and become whitish. The photo-curable resin inside the tank is irradiated with the light that passes through the tank. Therefore, when the tank is whitish, it is difficult to successfully irradiate the photo-curable resin inside the tank with the light. However, according to the above-described preferred embodiment, the tank may also be used in the second state in which the positions of the front and rear of the tank are interchanged from the positions thereof in the first state. Thus, if a whitish portion of the tank is located over the light passage portion in the first state, the whitish portion of the tank is then located outside of the region over the light passage portion in the second state. Consequently, even when a portion of the tank has become whitish, a three-dimensional object is successfully formed using the tank.

Various preferred embodiments of the present invention provide a three-dimensional printing apparatus that forms a high quality three-dimensional object.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, a three-dimensional printing apparatus according to preferred embodiments of the present invention will be described. Preferred embodiments described herein are naturally not intended to limit the present invention in any way. Components or elements having similar functions are identified by the same reference signs, and redundant description thereof will be omitted or simplified.

Figure 1:
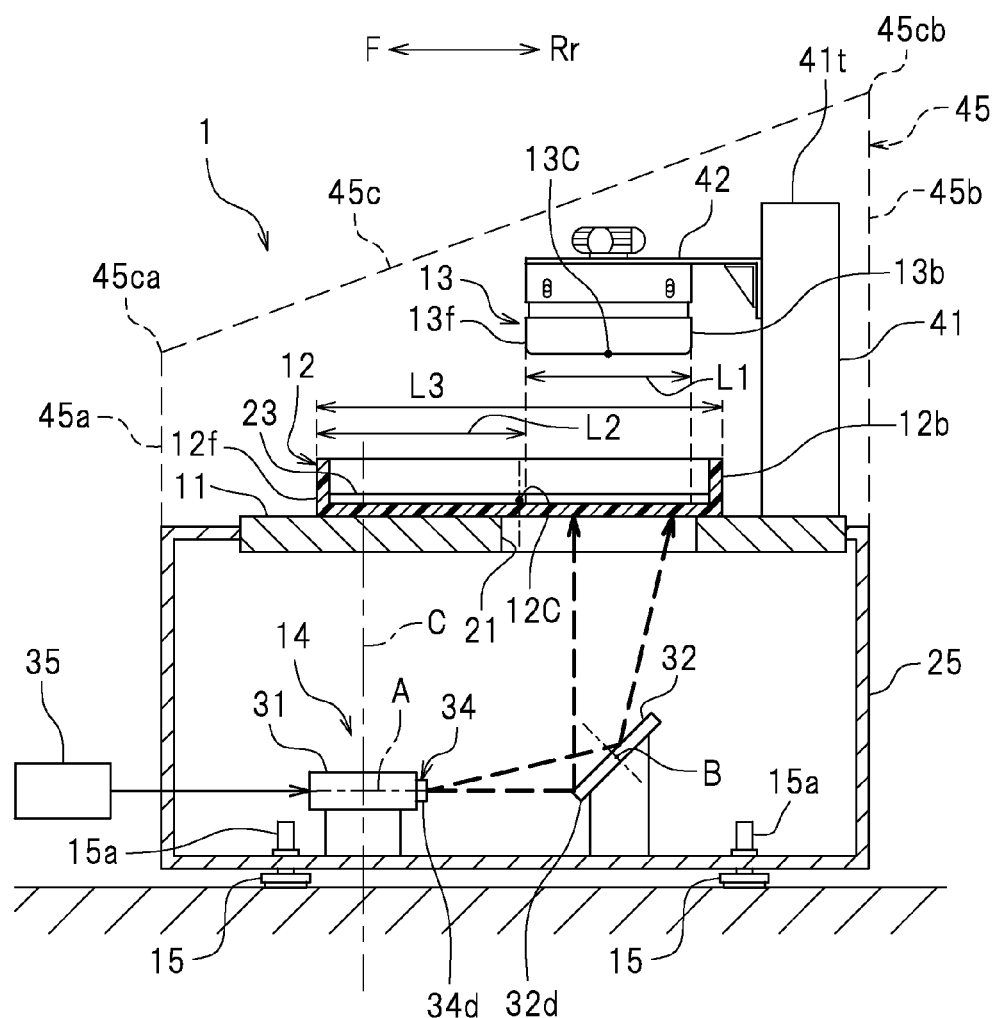
FIG. 1 is a longitudinal cross-sectional view of a three-dimensional printing apparatus according to a preferred embodiment of the present invention.
Figure 2:
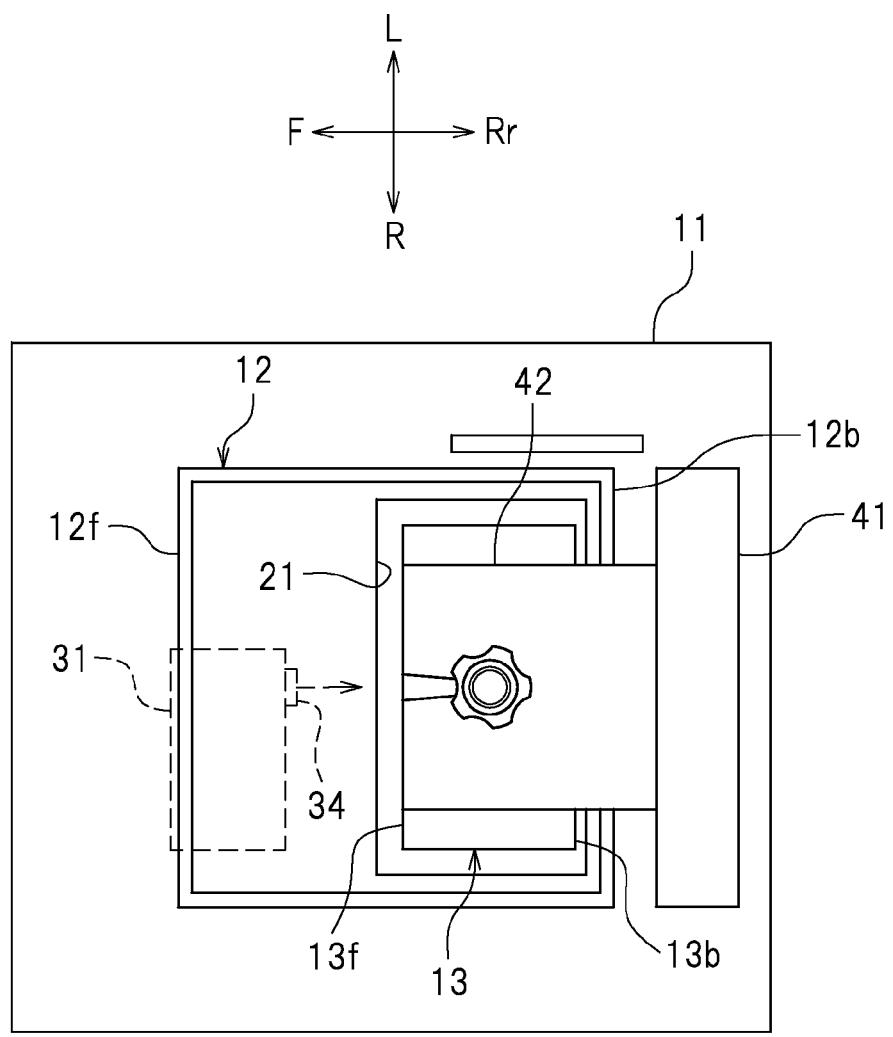
FIG. 2 is a plan view of the three-dimensional printing apparatus.
Figure 3:
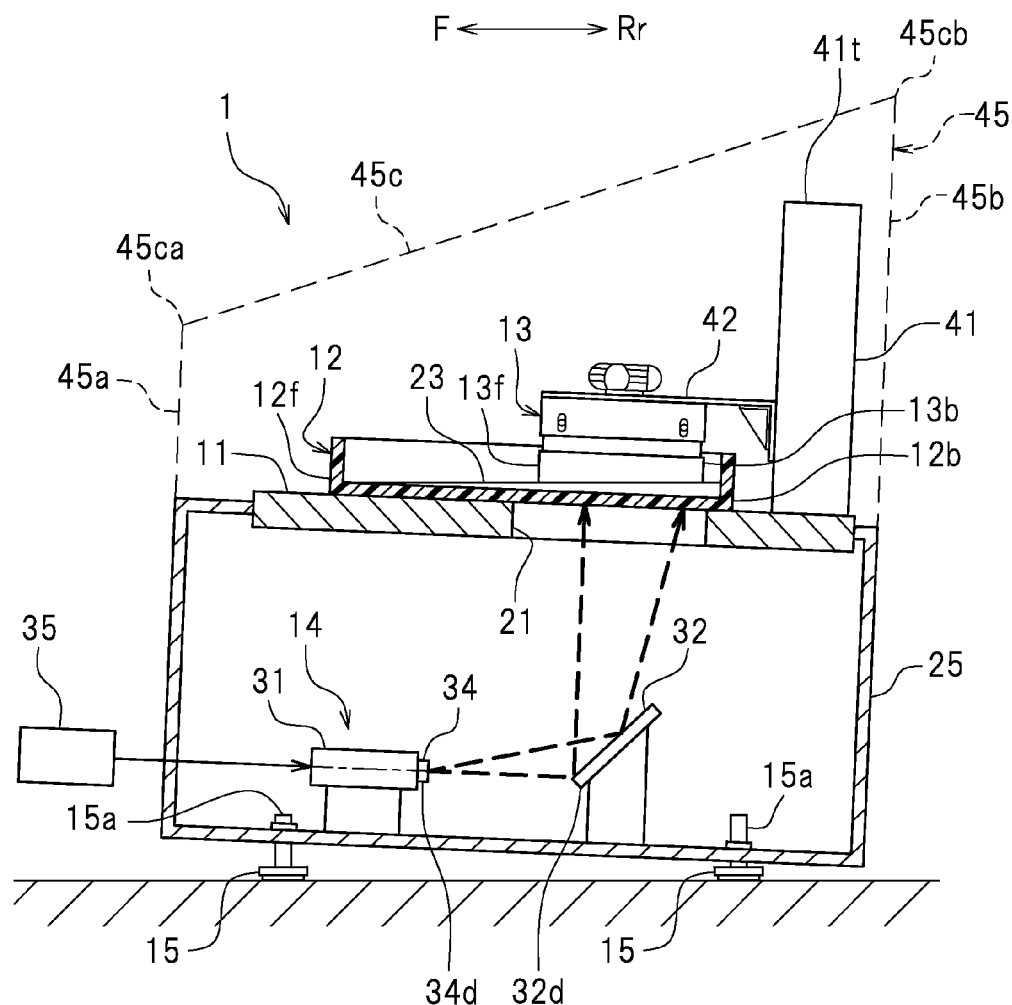
FIG. 3 is a longitudinal cross-sectional view of the three-dimensional printing apparatus that is tilted rearward.

FIG. 1 is a longitudinal cross-sectional view of a three-dimensional printing apparatus 1 according to the present preferred embodiment. FIG. 2 is a plan view of the three-dimensional printing apparatus 1. Note that in the following description, left and right portions of FIG. 1 correspond to front and rear portions of the three-dimensional printing apparatus 1, respectively. Upper and lower portions of FIG. 2 correspond to left and right portions of the three-dimensional printing apparatus 1, respectively. In FIGS. 1 to 3, the reference signs "F", "Rr", "L" and "R" indicate front, rear, left and right, respectively. It is to be noted that directions indicated by the reference signs are defined merely for the sake of convenience of description. These directions are not intended to limit how the three-dimensional printing apparatus 1 is installed in any way. As illustrated in FIG. 1, the three-dimensional printing apparatus 1 preferably includes a base 11, a tank 12, a holder 13, an optical device 14, and a control device 35.

The base 11 is provided with an opening 21. Light with which a photo-curable resin 23 (which will be described below) is to be irradiated passes through the opening 21. The opening 21 is not limited to any particular shape. As illustrated in FIG. 2, in the present preferred embodiment, the opening 21 preferably has a rectangular shape in a plan view, for example. The opening 21 is an example of a light passage portion.

As illustrated in FIG. 1, the tank 12 is placed on the base 11. The tank 12 is disposed so as to be attachable to the base 11. As illustrated in FIG. 2, with the tank 12 placed on the base 11, the tank 12 covers the opening 21 of the base 11. As illustrated in FIG. 1, the tank 12 stores the photo-curable resin 23 in liquid form. The photo-curable resin 23 is a resin that is curable by being irradiated with light. As illustrated in FIG. 2, the tank 12 is a receptacle that preferably has a rectangular or substantially rectangular shape in the plan view. In the plan view, the tank 12 preferably includes a rectangular or substantially rectangular bottom plate; a left plate that stands up from a left end portion of the bottom plate; a right plate that stands up from a right end portion of the bottom plate; a front plate that stands up from a front end portion of the bottom plate; and a rear plate that stands up from a rear end portion of the bottom plate. A portion of the bottom plate of the tank 12 is located over the opening 21 of the base 11 when the tank 12 is placed on the base 11. In this preferred embodiment, a rear portion of the bottom plate of the tank 12 is located over the opening 21. At least the bottom plate of the tank 12 is preferably made of a material that allows light to pass therethrough. For example, at least the bottom plate of the tank 12 is preferably made of a material such as a transparent resin or glass. In the present preferred embodiment, the tank 12 is made of a transparent acrylic resin. Note that a surface of the bottom plate of the tank 12 may be provided with a layer that prevents undesirable adhesion of the photo-curable resin 23. For example, the surface of the bottom plate of the tank 12 may be provided with a silicon layer.

As illustrated in FIG. 1, the holder 13 is disposed above the tank 12. As illustrated in FIG. 2, the holder 13 is disposed above the opening 21 of the base 11 in this preferred embodiment. The holder 13 is not limited to any particular shape. In this preferred embodiment, similarly to the opening 21, the holder 13 preferably has a rectangular or substantially rectangular shape in the plan view. The holder 13 is a raisable and lowerable member. The holder 13 lifts the photo-curable resin 23 that has been cured with irradiation of light emitted from a projector 31 (which will be described below) of the optical device 14 as illustrated in FIG. 1. The holder 13 is arranged so that when lowered, the holder 13 is immersed in the photo-curable resin 23 inside the tank 12. The holder 13 is also arranged so that when raised, the holder 13 lifts the photo-curable resin 23 that has been cured with irradiation of light. In the present preferred embodiment, the base 11 is provided with a support column 41 that extends in an up-down direction. A slider 42 is attached to a front portion of the support column 41. The slider 42 is raisable and lowerable along the support column 41. The slider 42 is driven to move upward or downward by a motor (not illustrated). In this preferred embodiment, the holder 13 is attached to the slider 42. Thus, the holder 13 is driven to move upward or downward by the motor. The support column 41 indirectly supports the holder 13 via the slider 42. Alternatively, the support column 41 may directly support the holder 13. The holder 13 is disposed in front of the support column 41.

Next, positional relationships between/among the holder 13, the tank 12, and the opening 21 of the base 11 will be described in detail. Note that the holder 13 may be immovable in a front-rear direction, or may be movable in the front-rear direction. When the holder 13 is movable in the front-rear direction, the positional relationships described below indicate positional relationships established when the holder 13 is located at a rearmost position. The holder 13 may be immovable in a right-left direction, or may be movable in the right-left direction. When the holder 13 is movable in the right-left direction, the positional relationships described below are supposed to mean positional relationships established when the holder 13 is located at a center position in the right-left direction.

As illustrated in FIG. 1, a length L3 of the tank 12 in the front-rear direction is longer than a length L1 of the holder 13 in the front-rear direction. In the present preferred embodiment, the length L3 of the tank 12 in the front-rear direction preferably is twice or more than twice the length L1 of the holder 13 in the front-rear direction. A front end 13f of the holder 13 is located rearward relative to a front end 12f of the tank 12. A rear end 13b of the holder 13 is located forward relative to a rear end 12b of the tank 12. A center 13C of the holder 13 in the front-rear direction is located rearward relative to a center 12C of the tank 12 in the front-rear direction. The tank 12 extends forward relative to the holder 13. As illustrated in FIG. 2, the tank 12 extends slightly rightward and leftward relative to the holder 13. As illustrated in FIG. 1, a length L2 between the front end 12f of the tank 12 and the front end 13f of the holder 13 in the front-rear direction is longer than a length between the front end 13f of the holder 13 and the rear end 13b of the holder 13 in the front-rear direction (i.e., the length L1 of the holder 13 in the front-rear direction). Alternatively, the length L2 between the front end 12f of the tank 12 and the front end 13f of the holder 13 in the front-rear direction may be equal to the length L1 of the holder 13 in the front-rear direction.

As illustrated in FIG. 2, the opening 21 of the base 11 is larger than the holder 13 in the front-rear direction and right-left direction in the plan view. The holder 13 is disposed inward relative to a peripheral edge of the opening 21 in the plan view.

As illustrated in FIG. 1, the optical device 14 is disposed below the base 11. The optical device 14 irradiates the photo-curable resin 23 in liquid form inside the tank 12 with light. In the present preferred embodiment, the optical device 14 preferably is contained in a case 25. The case 25 is provided under the base 11 so that a portion of the case 25 is covered with the base 11. The optical device 14 preferably includes the projector 31 and a mirror 32.

The projector 31 is an example of a light source that emits light. It is to be noted that the light source of the optical device 14 is not limited to the projector 31. In the present preferred embodiment, the projector 31 is disposed below a front portion of the base 11. The projector 31 preferably includes a lens 34. The lens 34 is disposed at a rear portion of the projector 31. The projector 31 emits light from front to rear through the lens 34. The direction in which light is projected from the projector 31 is not limited to any particular direction. In this preferred embodiment, an amount of light emitted from the projector 31 to a region above a horizontal plane passing through an optical axis A of the lens 34 is larger than an amount of light emitted from the projector 31 to a region below the horizontal plane passing through the optical axis A of the lens 34.

In the present preferred embodiment, the control device 35 is connected to the projector 31. The control device 35 is configured or programmed to control the light emitted from the projector 31. More specifically, the control device 35 is configured or programmed to control, for example, a wavelength band of the light, a shape of the light, and timing of emission of the light emitted from the projector 31. The control device 35 is not limited to any particular configuration. For example, the control device 35 may be a computer, for example. The control device 35 may include a central processing unit (hereinafter referred to as a "CPU"), a ROM that stores, for example, a program to be carried out by the CPU, and a RAM or the like.

Next, an installation position of the projector 31 will be described in detail. As illustrated in FIG. 1, the projector 31 is disposed forward relative to the holder 13. In this preferred embodiment, the projector 31 is disposed forward relative to the holder 13 and obliquely below the holder 13. A rear end portion of the projector 31 is disposed below the tank 12. More specifically, the rear end portion of the projector 31 is disposed immediately below the tank 12. A center C of the projector 31 in the front-rear direction is also disposed below the tank 12. In this preferred embodiment, a front end portion of the projector 31 is located forward relative to the front end 12f of the tank 12. Alternatively, the front end portion of the projector 31 may be located rearward relative to the front end 12f of the tank 12.

The mirror 32 serves to reflect the light, which has been emitted from the projector 31, toward the tank 12. In the present preferred embodiment, the mirror 32 is disposed below the opening 21 provided in the base 11. The mirror 32 is disposed behind the projector 31. The mirror 32 is inclined so that its front portion is located downward. The light emitted from the projector 31 is reflected by the mirror 32. The photo-curable resin 23 inside the tank 12 is irradiated with the reflected light through the opening of the base 11. In this preferred embodiment, before a three-dimensional object is formed, a light irradiation direction is preferably adjusted so that all the light from the projector 31 passes through the opening 21. In the present preferred embodiment, before a three-dimensional object is formed, the light irradiation direction is adjusted by adjusting a position of the projector 31 in the up-down direction. Alternatively, the light irradiation direction may be adjusted by adjusting an angle of the mirror 32.

Next, a positional relationship between the projector 31 and the mirror 32 will be described in detail. As illustrated in FIG. 1, the mirror 32 is disposed so as to be aligned with the projector 31 in the front-rear direction. In this preferred embodiment, the optical axis A of the lens 34 of the projector 31 is located lower than a center B of the mirror 32 in a side view. A lower end 34d of the lens 34 and a lower end 32d of the mirror 32 are located at the same or substantially the same height. A positional difference between the lower end 34d of the lens 34 and the lower end 32d of the mirror 32 in the up-down direction may be equal to or smaller than a length of the projector 31 in the up-down direction, or may be equal to or smaller than a length of the lens 34 in the up-down direction. Naturally, the positional difference between the lower end 34d of the lens 34 and the lower end 32d of the mirror 32 in the up-down direction may be zero.

The three-dimensional printing apparatus 1 preferably includes legs 15. The legs 15 are an example of a tilting device. The legs 15 are configured to tilt the tank 12 so that a front portion of a bottom surface of the tank 12 is disposed higher than a rear portion of the bottom surface of the tank 12. In other words, the legs 15 are configured to tilt the tank 12 so that the tank 12 is inclined rearward. In the present preferred embodiment, the legs 15 preferably are provided at a bottom plate of the case 25. The legs 15 preferably are provided in four corners of the bottom plate of the case 25. The number of the legs 15 preferably is four in total. In FIG. 1, the legs 15 provided at left front and left rear portions of the bottom plate of the case 25 are illustrated. Although not illustrated, the similar legs 15 are also provided at right front and right rear portions of the bottom plate of the case 25.

The case 25 supports the base 11. The tank 12 and the support column 41 are placed on the base 11, the holder 13 is disposed above the base 11, and the optical device 14 is disposed below the base 11. In the present preferred embodiment, the tank 12 is tilted by adjusting lengths of the legs 15. By making the front legs 15 longer than the rear legs 15, the case 25 is tilted so that its rear portion is located downward. When the case 25 is tilted so that its rear portion is located downward, the tank 12 placed on the base 11 is also tilted so that its rear portion is located downward. In this preferred embodiment, the length of each of the four legs 15 is independently adjustable. Each leg 15 preferably includes a shaft 15a to be inserted into a hole (not illustrated) provided in the bottom plate of the case 25. A length of the shaft 15a to be inserted into the bottom plate of the case 25 is appropriately adjusted, thus adjusting the length of the associated leg 15. Hence, the tank 12 is appropriately tilted. For example, as illustrated in FIG. 3, the two front ones of the four legs 15 are made higher than the two rear ones of the four legs 15, thus tilting the tank 12 rearward.

A mechanism configured to adjust the length of each shaft 15a to be inserted into the bottom plate of the case 25 is not limited to any particular mechanism. For example, the shafts 15a may each include an external thread, and the holes of the bottom plate of the case 25 may each include an internal thread. In that case, the length of each leg 15 is appropriately adjusted by rotating the associated shaft 15a.

In the present preferred embodiment, when the tank 12 is tilted, the three-dimensional printing apparatus 1 itself is also tilted. Specifically, when the lengths of the front legs 15 and the lengths of the rear legs 15 are different from each other, the tank 12 is tilted, and in addition, the base 11, the optical device 14 and the holder 13 are also tilted similarly to the tank 12. However, even in that case, relative positional relationships between/among the optical device 14, the opening 21 of the base 11, the tank 12, and the holder 13 do not change. In other words, the positional relationships between/among the elements of the three-dimensional printing apparatus 1 do not change. Hence, even when the tank 12 is tilted, a resulting three-dimensional object does not degrade in quality.

As illustrated in FIG. 1, in the present preferred embodiment, the three-dimensional printing apparatus 1 is provided with a cover 45. The cover 45 is a member that covers components such as the tank 12, the holder 13 and the support column 41 which are disposed higher than the base 11. The cover 45 prevents the light emitted from the optical device 14 from being leaked to outside. The cover 45 is preferably made of a material that blocks light including a wavelength by which the photo-curable resin 23 is cured. The cover 45 may be an opaque cover. The cover 45 makes it difficult for a foreign substance or the like to go into the photo-curable resin 23 inside the tank 12 from outside. The cover 45 preferably includes a front wall 45a that extends vertically; a rear wall 45b that extends vertically, and an upper wall 45c inclined so that its front portion is located downward. In this preferred embodiment, a rear end 45cb of the upper wall 45c is located higher than an upper end 41t of the support column 41. A front end 45ca of the upper wall 45c is located lower than the upper end 41t of the support column 41.

The three-dimensional printing apparatus 1 according to the present preferred embodiment forms a three-dimensional object as follows. First, the control device 35 causes the projector 31 to emit light through the lens 34. The light emitted from the projector 31 is reflected by the mirror 32. The light reflected by the mirror 32 passes through the opening 21 of the base 11. The light that has passed through the opening 21 then passes through the bottom plate of the tank 12. The photo-curable resin 23 stored inside the tank 12 and located between the bottom plate of the tank 12 and the holder 13 is irradiated with the light that has passed through the bottom plate of the tank 12. The photo-curable resin 23 that has been irradiated with the light is cured. The light irradiation position is appropriately changed by appropriately changing the angle of the mirror 32. Thus, the position at which the photo-curable resin 23 is to be cured is changed in sequence. As a result, a solid resin layer having a desired cross-sectional shape is formed.

When the solid resin layer has been formed, the motor (not illustrated) by which the holder 13 is raised and lowered is driven. Upon driving of the motor, the holder 13 is moved upward. In this case, the solid resin layer held by the holder 13 is lifted. Then, a gap is provided between the lifted resin layer and the tank 12, and the photo-curable resin 23 in liquid form flows into this gap. Then, the photo-curable resin 23 in the gap is irradiated with the light emitted from the projector 31. As a result, another solid resin layer having a desired cross-sectional shape is formed. Thereafter, similar operations are repeated, thus producing an object having a desired three-dimensional shape.

As described above, in the present preferred embodiment, the length L2 between the front end 12f of the tank 12 and the front end 13f of the holder 13 in the front-rear direction is longer than the length L1 of the holder 13 in the front-rear direction as illustrated in FIG. 1. The tank 12 extends to a great extent forward relative to the holder 13. Thus, an area of the tank 12 in the plan view is large. Therefore, the photo-curable resin 23 in liquid form is more likely to flow inside the tank 12 than when a tank having a small area in the plan view is used. Upon lifting of the cured photo-curable resin 23 by the holder 13, the photo-curable resin 23 in liquid form is supplied to a region under the cured photo-curable resin 23. According to the present preferred embodiment, the fresh photo-curable resin 23 that is not yet irradiated with light is easily supplied to the region under the cured photo-curable resin 23. Consequently, a resulting three-dimensional object is improved in quality.

Since the area of the tank 12 in the plan view is large, a liquid level of the photo-curable resin 23 inside the tank 12 is kept low. Hence, when the holder 13 is immersed in the photo-curable resin 23 inside the tank 12, the photo-curable resin 23 is unlikely to spill from the tank 12.

Figure 4A:
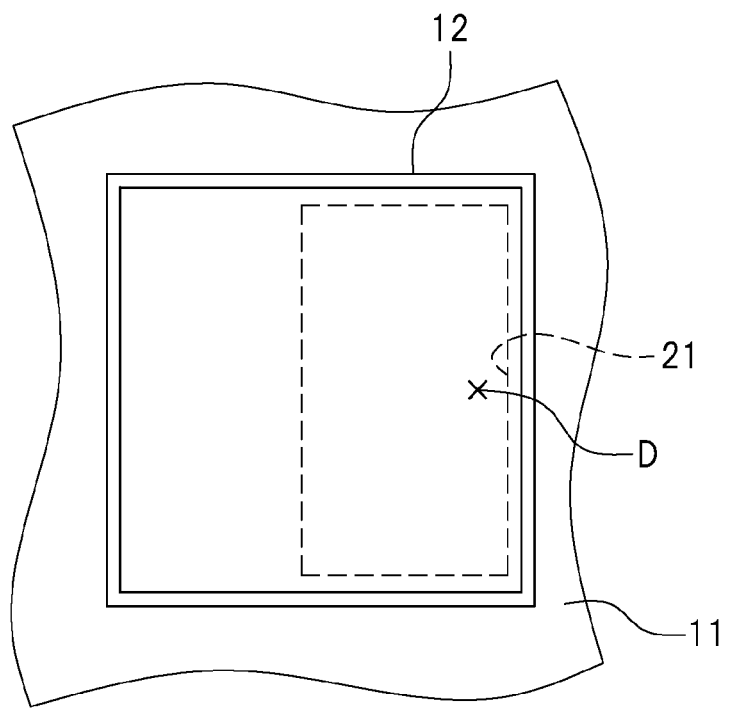
FIG. 4A is a plan view illustrating a state in which a tank is placed on a base.

When the same spot of the tank 12 is irradiated with the light from the projector 31 for a long period of time, a portion of the tank 12 might be partially deteriorated with time. Due to the deterioration with time, the portion of the tank 12 might become whitish. The photo-curable resin 23 inside the tank 12 is irradiated with the light that passes through the tank 12. Therefore, when the tank 12 is whitish, it is difficult to successfully irradiate the photo-curable resin 23 inside the tank 12 with the light. FIG. 4A is a plan view illustrating a state in which the tank 12 is placed on the base 11. FIG. 4A illustrates a "first state" of the tank 12 according to a preferred embodiment of the present invention. In FIG. 4A, the tank 12 is placed on the base 11 so that the rear portion of the bottom plate of the tank 12 covers the opening 21 of the base 11. For example, if a position D in the rear portion of the bottom plate of the tank 12 continues to be irradiated with light while the tank 12 is in the first state as illustrated in FIG. 4A, the position D might become whitish. Thus, a portion of the photo-curable resin 23 which is stored inside the tank 12 and located over the position D might be less likely to be cured.

Figure 4B:
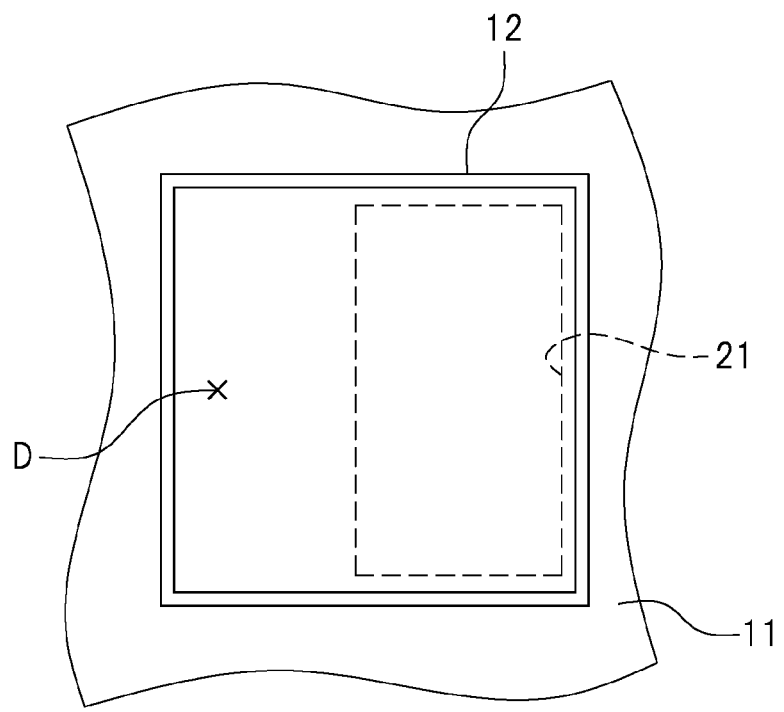
FIG. 4B is a plan view illustrating a state in which positions of front and rear of the tank are interchanged from the positions thereof illustrated in FIG. 4A.

However, in the present preferred embodiment, the tank 12 extends to a great extent forward relative to the holder 13. Positions of front and rear of the tank 12 may be interchanged from the positions thereof in the first state illustrated in FIG. 4A. FIG. 4B is a plan view illustrating another state in which the tank 12 is placed on the base 11. FIG. 4B illustrates a "second state" of the tank 12 according to a preferred embodiment of the present invention. As illustrated in FIG. 4B, the tank 12 may be placed on the base 11 so that the front portion of the bottom plate of the tank 12 covers the opening 21. Therefore, when the rear portion of the bottom plate of the tank 12 has become whitish, the tank 12 may be used after interchanging the positions of the front and rear of the tank 12 as illustrated in FIG. 4B. A portion of the bottom plate of the tank 12 which is located over the opening 21 in the first state (FIG. 4A) is located outside of a region over the opening 21 in the second state (FIG. 4B). In other words, the tank 12 may be used while the position D is located outside of the region over the opening 21. Consequently, even when a portion of the tank 12 has become whitish, a three-dimensional object is successfully formed with the use of the tank 12.

The support column 41 that supports the holder 13 so that the holder 13 is raisable and lowerable may be disposed rightward or leftward of the holder 13. However, as illustrated in FIG. 1, the holder 13 is disposed in front of the support column 41 in the present preferred embodiment. In other words, the support column 41 is disposed behind the holder 13. Therefore, interference between the support column 41 and the tank 12 that extends forward relative to the holder 13 is prevented.

As the tank 12 extends forward, the cover 45 that covers components such as the tank 12 tends to increase in size accordingly. However, in the present preferred embodiment, the upper wall 45c of the cover 45 is inclined so that its front portion is located downward. Therefore, an increase in size of the cover 45 is prevented more effectively than when the upper wall 45c of the cover 45 extends horizontally. Consequently, an increase in size of the three-dimensional printing apparatus 1 is prevented.

In the present preferred embodiment, the projector 31 is disposed forward relative to the holder 13, and the rear end portion of the projector 31 is disposed below the tank 12. As the tank 12 extends forward, extra space is provided below the front portion of the tank 12 accordingly. The projector 31 is disposed in this space, thus effectively utilizing the extra space. As a result, the three-dimensional printing apparatus 1 is made compact in size.

As illustrated in FIG. 2, the opening 21 provided in the base 11 is larger than the holder 13 in the front-rear direction and right-left direction in the plan view. The holder 13 is disposed inward relative to the peripheral edge of the opening 21 in the plan view. Thus, the light emitted from the projector 31 passes through the opening 21, so that a portion of the photo-curable resin 23 which is close to the holder 13 is easily irradiated with the light. Hence, a desired three-dimensional object is easily formed. When the opening 21 is large, there is a high possibility that a portion of the photo-curable resin 23 which is not close to the holder 13 will also be irradiated with the light. Therefore, it might be difficult to supply the fresh photo-curable resin 23 to a region close to the holder 13 upon raising of the holder 13. However, in the present preferred embodiment, flowability of the photo-curable resin 23 inside the tank 12 is favorably high. Hence, the fresh photo-curable resin that is not yet irradiated with the light is likely to be supplied to the region close to the holder 13. Consequently, even when the opening 21 is large, a high quality three-dimensional object is formed.

As the light source of the optical device 14, the projector 31 is used. As illustrated in FIG. 1, the projector 31 is disposed so as to be aligned with the mirror 32 in the front-rear direction. The light emitted from the projector 31 is emitted slightly upward relative to the optical axis A of the lens 34. The optical axis A of the lens 34 of the projector 31 is located lower than the center B of the mirror 32 in the side view. The lower end 34d of the lens 34 and the lower end 32d of the mirror 32 are located at the same or substantially the same height. Therefore, the light emitted from the projector 31 is easily reflected by the mirror 32. Hence, the light reflected by the mirror 32 is likely to be guided toward the opening 21 of the base 11. Consequently, the photo-curable resin 23 inside the tank 12 is successfully irradiated with the light.

The three-dimensional printing apparatus 1 preferably includes the legs 15. The legs 15 serve to tilt the tank 12 so that the front portion of the bottom surface of the tank 12 is disposed higher than the rear portion of the bottom surface of the tank 12. Thus, when the amount of the photo-curable resin 23 inside the tank 12 is small, the tank 12 is tilted rearward by adjusting the length of each leg 15 as illustrated in FIG. 3. Therefore, the photo-curable resin 23 is gathered in the rear portion of the tank 12. Hence, even when the amount of the photo-curable resin 23 inside the tank 12 is small, the photo-curable resin 23 in liquid form is successfully supplied to a region under the photo-curable resin 23 that has been cured with irradiation of light.

In the present preferred embodiment, the case 25 is tilted by adjusting the length of each leg 15. The case 25 is tilted, thus tilting the tank 12. Hence, the tank 12 is tilted simply by tilting the case 25. The case 25 supports the base 11, the optical device 14 and the holder 13. Thus, upon tilting of the case 25, the tank 12 is tilted, and in addition, the base 11, the optical device 14 and the holder 13 are also tilted together with the tank 12. Therefore, even when the case 25 is tilted, the relative positional relationships between/among the optical device 14, the opening 21 of the base 11, the tank 12, and the holder 13 do not change. Hence, even when the case 25 is tilted, a resulting three-dimensional object does not degrade in quality.

One preferred embodiment of the present invention has been described thus far. However, the foregoing preferred embodiment is merely illustrative, and the present invention may be embodied in various other forms.

In the foregoing preferred embodiment, the tank 12 preferably has a rectangular or substantially rectangular shape in the plan view. In an alternative, the tank 12 may have a square shape or an oblong shape in the plan view, for example. In another alternative, the tank 12 may have a shape other than a rectangular shape in the plan view, for example.

In the foregoing preferred embodiment, the four legs 15 preferably are provided in the four corners of the bottom plate of the case 25. However, the number of the legs 15 is not limited to four.

In the foregoing preferred embodiment, the tilting device that tilts the tank 12 preferably includes the length-adjustable legs 15. However, the tilting device is not limited to the legs 15. Furthermore, the tilting device is not limited to a device that tilts the tank 12 by tilting the case 25. The tilting device may be a device that tilts only the tank 12. For example, the tilting device may be length-adjustable legs provided on the tank 12.

In the foregoing preferred embodiment, the optical device 14 preferably includes the mirror 32. However, the mirror 32 is not necessarily essential. The optical device 14 may be arranged so that light is emitted from the light source toward the opening 21 of the base 11 directly.

In the foregoing preferred embodiment, the light source of the optical device 14 preferably is the projector 31. However, the light source is not limited to the projector 31. Alternatively, the light source may be a laser, for example.

In the foregoing preferred embodiment, the light passage portion through which light to be applied to the photo-curable resin 23 passes preferably is the opening 21 provided in the base 11. However, the light passage portion is not limited to the opening 21. It is only necessary for the light passage portion to allow light, which is to be applied to the photo-curable resin 23, to pass therethrough. For example, the light passage portion may be a transparent plate provided in the base 11. In another alternative, the base 11 may be a transparent plate. In that case, the base 11 itself serves as the light passage portion.

The terms and expressions used herein are used for explanation purposes and should not be construed as being restrictive. It should be appreciated that the terms and expressions used herein do not eliminate any equivalents of features illustrated and mentioned herein, and allow various modifications falling within the claimed scope of the present invention. The present invention may be embodied in many different forms. The present disclosure is to be considered as providing examples of the principles of the present invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-dimensional printing apparatus comprising:
a tank storing a photo-curable resin in liquid form;
a base on which the tank is placed, the base including a light passage portion through which light to be applied to the photo-curable resin passes;
an optical device disposed below the base and including at least a light source that emits light, the optical device being arranged to irradiate the photo-curable resin inside the tank with the light emitted from the light source through the light passage portion;
a holder provided above the tank and configured to be raisable and lowerable, the holder being configured so that when lowered, the holder is immersed in the photo-curable resin inside the tank, and when raised, the holder lifts the photo-curable resin that has been cured with irradiation of the light;
a tilting device configured to tilt the tank so that a front portion of a bottom surface of the tank is disposed higher than a rear portion of the bottom surface of the tank; and
a case that supports the base, the optical device, and the holder; wherein
a length of the tank in a given direction is longer than a length of the holder in the given direction;
when the given direction is defined as a front-rear direction, a center of the holder in the front-rear direction is located rearward relative to a center of the tank in the front-rear direction, and a length between a front end of the tank and a front end of the holder in the front-rear direction is equal to or longer than the length of the holder in the front-rear direction; and
the tilting device is configured to tilt the case, the tank, the base, the optical device, and the holder.

2. The three-dimensional printing apparatus according to claim 1, further comprising a support column placed on the base, the support column being configured to support the holder so that the holder is raisable and lowerable, wherein the holder is disposed in front of the support column.

3. The three-dimensional printing apparatus according to claim 2, further comprising a cover that covers the tank, the holder, and the support column, wherein the cover includes an upper wall inclined so that a front portion thereof is located downward.

4. The three-dimensional printing apparatus according to claim 1, wherein the light source of the optical device is disposed forward relative to the holder, and a rear end portion of the light source is disposed below the tank.

5. The three-dimensional printing apparatus according to claim 1, wherein
the light passage portion is an opening provided in the base;
the opening is larger than the holder in the front-rear direction and a right-left direction in a plan view; and
the holder is disposed inward relative to a peripheral edge of the opening in the plan view.

6. The three-dimensional printing apparatus according to claim 1, wherein
the light source is a projector that includes a lens and is configured to emit light rearward;
the optical device further includes a mirror disposed behind the projector, the mirror being configured to reflect the light, emitted from the projector, toward the light passage portion of the base; and
an optical axis of the lens is located lower than a center of the mirror in a side view.

7. The three-dimensional printing apparatus according to claim 6, wherein a lower end of the lens and a lower end of the mirror are located at the same height or substantially the same height.

8. The three-dimensional printing apparatus according to claim 1, wherein
the tank includes a bottom plate, a portion of which is located over the light passage portion when the tank is placed on the base; and
when a state in which the tank is placed on the base so that a rear portion of the bottom plate covers the light passage portion is defined as a first state and a state in which the tank is placed on the base so that positions of a front and a rear of the tank are interchanged from the positions thereof in the first state and a front portion of the bottom plate covers the light passage portion is defined as a second state, a portion of the bottom plate which is located over the light passage portion in the first state is located outside of a region over the light passage portion in the second state.

* * * * *